United States Patent
Wang et al.

(10) Patent No.: US 11,549,861 B2
(45) Date of Patent: Jan. 10, 2023

(54) DETERMINATION OF PULLEY RATIO OF A BELT-DRIVE BLOWER

(71) Applicant: Lennox Industries Inc., Richardson, TX (US)

(72) Inventors: Shiliang Wang, Dallas, TX (US); Rakesh Goel, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 15 days.

(21) Appl. No.: 17/405,169

(22) Filed: Aug. 18, 2021

(65) Prior Publication Data

US 2021/0372884 A1  Dec. 2, 2021

Related U.S. Application Data

(63) Continuation of application No. 16/885,875, filed on May 28, 2020, now Pat. No. 11,150,162.

(51) Int. Cl.

| | |
|---|---|
| *F24F 11/63* | (2018.01) |
| *F24F 11/77* | (2018.01) |
| *F24F 11/86* | (2018.01) |
| *F24F 11/52* | (2018.01) |
| *G01M 13/023* | (2019.01) |

(52) U.S. Cl.
CPC .......... *G01M 13/023* (2013.01); *F24F 11/52* (2018.01); *F24F 11/63* (2018.01); *F24F 11/77* (2018.01); *F24F 11/86* (2018.01)

(58) Field of Classification Search
CPC .. F24F 11/52; F24F 11/63; F24F 11/77; F24F 11/86
See application file for complete search history.

(56) References Cited

U.S. PATENT DOCUMENTS

| | | | |
|---|---|---|---|
| 7,552,914 | B1 | 6/2009 | Feldstein |
| 7,934,702 | B1 | 5/2011 | Feldstein |
| 9,568,209 | B2 | 2/2017 | Rugge et al. |
| 2003/0118450 | A1 | 6/2003 | Iwanami et al. |
| 2007/0237648 | A1 | 10/2007 | Ooya |
| 2011/0219797 | A1 | 9/2011 | Taguchi |
| 2015/0128483 | A1 | 5/2015 | Krupp et al. |
| 2018/0162377 | A1 | 6/2018 | Colavincenzo |
| 2021/0197645 | A1 | 7/2021 | Larson et al. |

FOREIGN PATENT DOCUMENTS

| | | |
|---|---|---|
| CN | 102384676 A | 3/2012 |
| WO | 2020202012 A1 | 10/2020 |

OTHER PUBLICATIONS

Wang, S. et al., "Determination of Pulley Ratio of a Belt-Drive Blower," U.S. Appl. No. 16/885,875, filed May 28, 2020, 40 pages.

*Primary Examiner* — Nelson J Nieves
(74) *Attorney, Agent, or Firm* — Baker Botts L.L.P.

(57) ABSTRACT

An HVAC system includes a blower. The blower includes a driven pulley and a motor with a driver pulley. A motor drive supplies electrical power to the motor. A controller receives a benchmark rate of the flow of air provided by the blower and a corresponding benchmark output current of the motor drive. A benchmark input power corresponding to the benchmark output current is determined based on a predetermined relationship between input power and output current for the motor drive. A ratio of the benchmark rate of the flow of air provided by the blower to the benchmark input power is determined. The controller determines a pulley ratio for the blower based on this ratio.

20 Claims, 6 Drawing Sheets

DETERMINATION OF PULLEY RATIO OF A BELT-DRIVE BLOWER

CROSS-REFERENCE TO RELATED APPLICATIONS

This application is a continuation of U.S. patent application Ser. No. 16/885,875 filed May 28, 2020, by Shiliang Wang et al., and entitled "DETERMINATION OF PULLEY RATIO OF A BELT-DRIVE BLOWER," which is incorporated herein by reference.

TECHNICAL FIELD

The present disclosure relates generally to heating, ventilation, and air conditioning (HVAC) systems and methods of their use. In certain embodiments, the present disclosure relates to determination of pulley ratio of a belt-drive blower.

BACKGROUND

Heating, ventilation, and air conditioning (HVAC) systems are used to regulate environmental conditions within an enclosed space. A blower of the HVAC system provides a flow of air through the HVAC system. In cooling mode operation of the HVAC system, the flow of air may be cooled via heat transfer with refrigerant and returned to the enclosed space as cooled conditioned air. In heating mode operation of the HVAC system, the flow of air may be heated via heat transfer with a heating element and returned to the enclosed space as heated conditioned air.

SUMMARY OF THE DISCLOSURE

In an embodiment, a heating, ventilation and air conditioning (HVAC) system includes a blower. The blower includes a driven pulley configured, when rotated, to cause a flow of air to be provided through at least one duct of the HVAC system. The blower includes a motor configured, when supplied electrical power from a motor drive, to cause a driver pulley to rotate. The driver pulley is coupled to the driven pulley via a belt. The motor drive is configured to supply the electrical power to the motor of the blower. A controller is communicatively coupled to the motor drive. The controller receives a benchmark rate of the flow of air provided by the blower and a corresponding benchmark output current of the motor drive associated with operation of the blower at a test condition. The test condition corresponds to operating the blower at a predefined motor drive frequency. The controller determines a benchmark input power corresponding to the benchmark output current based on a predetermined relationship between input power and output current for the motor drive. The controller determines a flow rate-to-input power ratio corresponding to a ratio of the benchmark rate of the flow of air provided by the blower to the benchmark input power. The controller determines a pulley ratio for the blower based on a predetermined relationship between the flow rate-to-input power ratio and the pulley ratio for the blower. The determined pulley ratio corresponds to a calculated value of a ratio of a diameter of the driven pulley to a diameter of the driver pulley of the blower.

The rate of airflow through an HVAC system may change over time because of changes in airflow resistance. Airflow resistance might change because of a buildup of material on an air filter of the system (e.g., the buildup of dust on the filter), a blockage of a duct of the HVAC system, changes to the duct design (e.g., adding/removing ductwork, changing flow profile through the HVAC system (e.g., opening/closing vents, etc.), and the like. If the rate of airflow through an HVAC system is below a threshold value for a period of time, an evaporator coil of the HVAC system may freeze resulting in extended downtimes of the HVAC system for maintenance. Previous technology lacks the ability to reliably monitor the rate of airflow provided by a blower and to detect when the rate of the airflow provided by the blower falls below a threshold level. Previously, a decrease in the rate of airflow would typically go undetected until a user recognized the loss of expected air flow rate. Belt-drive blowers, which are used in many common HVAC systems do not provide information about the rate of airflow provided by the blower, and sensors to measure rates of such airflows are costly and unreliable. As such, previous systems commonly lack measurements of the rate of airflow provided by blowers.

This disclosure solves problems of previous technology, including those described above, by facilitating the determination of a pulley ratio of a belt-drive blower, which can be used to determine flow rates of air provided by the blower without relying on measurements from air flow rate sensors. When a loss of air flow rate is detected sooner, as is facilitated by the present disclosure, damage and associated costs and system downtimes can be avoided. This disclosure may facilitate the provision of an alert when a predetermined amount of loss of air flow rate is detected. This alert may facilitate the initiation of corrective measures before damage to the HVAC system and/or extended downtimes. For example, in some cases, the alert may prompt a user to change an air filter of the HVAC system. If upon changing the air filter, the loss of air flow rate is still detected, further maintenance may be indicated. As another example, a fault associated with a significant loss of airflow can be detected and operation of the HVAC system may be automatically halted to prevent damage to system components.

The HVAC system described in this disclosure may have improved performance compared to previous systems because other system parameters (e.g., compressor speeds) can be adjusted to preferred values based on the more accurate air flow rate measurements achieved through the determination of a blower pulley ratio. For instance, compressor speed may be adjusted to obtain a desired ratio of flow rate per tonnage of cooling (e.g., a predetermined CFM/ton ratio) based on a more accurate air flow rate measurement. The HVAC system controller described in this disclosure may adjust power supplied to a blower to achieve a desired rate of airflow, even when air flow resistance in the system changes over time (e.g., due to dust buildup on an air filter). The systems and methods described in this disclosure may be integrated into a practical application for providing reliable air flow rate measurements for belt-drive blowers, via an estimated pulley ratio. This disclosure facilitates accurate flow rate measurement even following a change in air flow resistance in the system (e.g., caused by dust buildup on an air filter).

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 7 of the drawings, like numerals being used for like and corresponding parts of the various drawings.

As described above, prior to the present disclosure, there was a lack of tools for determining rate of airflow provided by a belt-drive blower. For example, because the pulley ratio of a belt-drive blower is typically adjusted at the time of installation, the pulley ratio is not known. The HVAC system controller described in this disclosure solves these problems of previous technology by facilitating the determination of a pulley ratio of a belt-driver blower. With the pulley ratio having been determined, the rate of airflow provided by the blower can be determined if other information is known (e.g., the external static pressure at the outlet of the blower). This disclosure further facilitates the determination of the rate of airflow provided by the blower when the blower is operating at predefined test conditions (e.g., at a predefined motor drive frequency). The controller may use determined flow rates to appropriately adjust system operation (e.g., to achieve a desired rate of airflow or to achieve a desired CFM/ton ratio) and/or to prompt users to perform corrective actions such as changing an air filter of the HVAC system if the flow rate falls below a threshold level.

HVAC System

Figure 1:
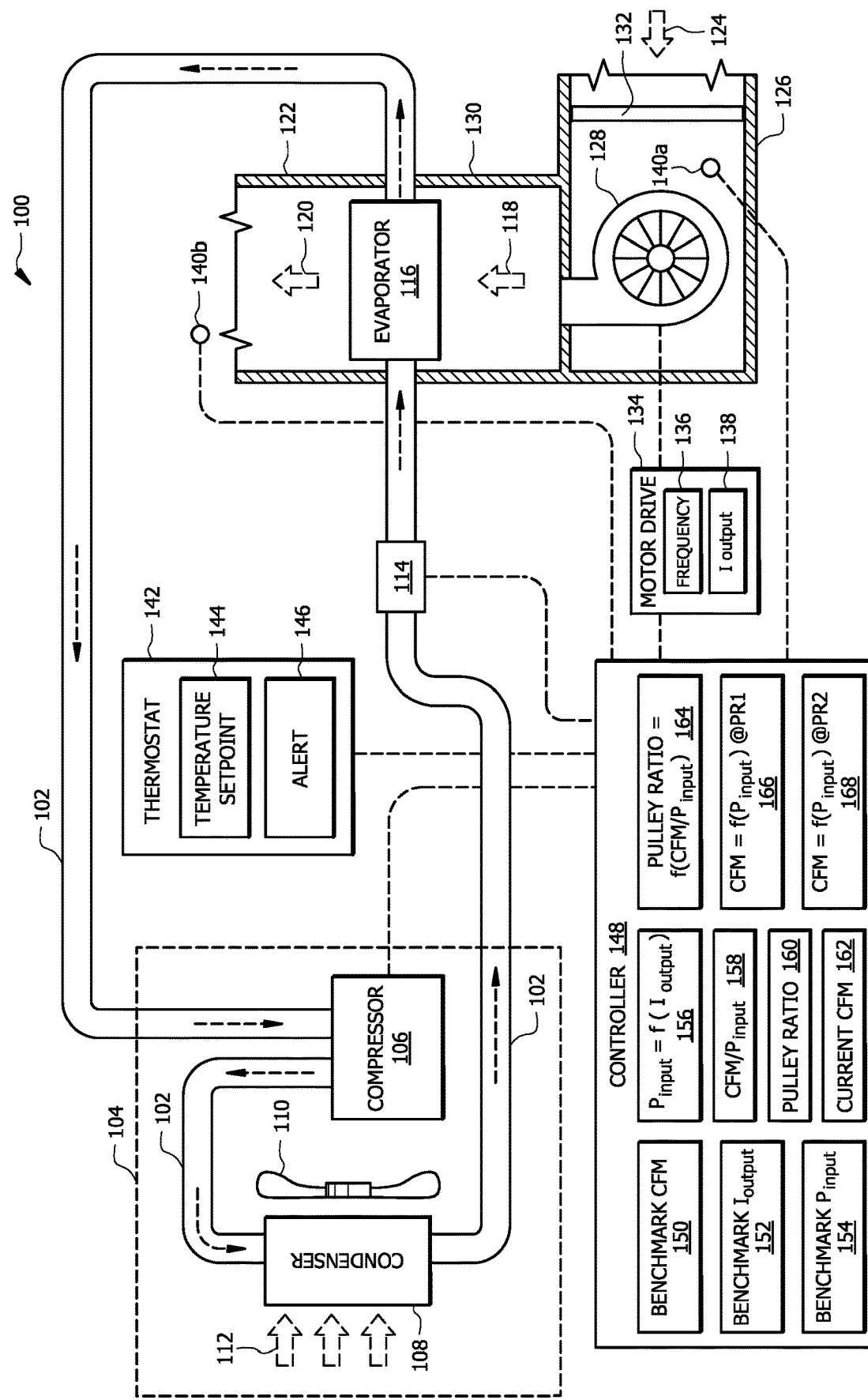
FIG. 1 is a diagram of an example HVAC system configured for the determination of a pulley ratio of a blower of the HVAC system.

FIG. 1 is a schematic diagram of an embodiment of an HVAC system 100 with a controller 148 configured to determine a pulley ratio 160 for a blower 128 of the HVAC system 100. The pulley ratio 160 may generally be used to determine a rate 162 (e.g., in cubic feet per minute (CFM)) of the airflow 118 provided by the blower 128 of the system 100. The HVAC system 100 conditions air for delivery to a conditioned space. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system 100 may be located within the building and portion(s) outside the building. The HVAC system 100 may include one or more heating elements, not shown for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, at least one condensing unit 104, an expansion valve 114, an evaporator 116, a blower 128 with a corresponding motor drive 134, a thermostat 142, and a controller 148. The working-fluid conduit subsystem 102 facilitates the movement of a working fluid (e.g., a refrigerant) through a cooling cycle such that the working fluid flows as illustrated by the dashed arrows in FIG. 1. The working fluid may be any acceptable working fluid including, but not limited to hydroflurocarbons (e.g. R-410A) or any other suitable type of refrigerant.

The condensing unit 104 includes a compressor 106, a condenser 108, and a fan 110. In some embodiments, the condensing unit 104 is an outdoor unit while other components of system 100 may be located indoors. The compressor 106 is coupled to the working-fluid conduit subsystem 102 and compresses (i.e., increases the pressure of) the working fluid. The compressor 106 of condensing unit 104 may be a single-stage compressor, a variable-speed compressor, or a multi-stage compressor. A variable-speed compressor is generally configured to operate at different speeds to increase the pressure of the working fluid to keep the working fluid moving along the working-fluid conduit subsystem 102. If compressor 106 is a variable-speed compressor, the speed of the compressor 106 can be modified to adjust the cooling capacity of the HVAC system 100. In the multi-stage compressor configuration, one or more compressors can be turned on or off to adjust the cooling capacity of the HVAC system 100.

The compressor 106 is in signal communication with the controller 148 using wired and/or wireless connection. The controller 148 provides commands and/or signals to control operation of the compressor 106 and/or receives signals from the compressor 106 corresponding to a status of the compressor 106. For example, when the compressor 106 is a variable-speed compressor, the controller 148 may provide signals to control compressor speed. When the compressor 106 operates as a multi-stage compressor, the signals may correspond to an indication of which compressors to turn on and off to adjust the compressor 106 for a given cooling capacity. The controller 148 may operate the compressor 106 in different modes corresponding to load conditions (e.g., the amount of cooling or heating requested from the HVAC system 100). The controller 148 is described in greater detail below and with respect to FIG. 7.

The condenser 108 is configured to facilitate movement of the working fluid through the working-fluid conduit subsystem 102. The condenser 108 is generally located downstream of the compressor 106 and is configured to remove heat from the working fluid. The fan 110 is configured to move air 112 across the condenser 108. For example, the fan 110 may be configured to blow outside air through the condenser 108 to help cool the working fluid flowing therethrough. The fan 110 may be in communication with the controller 148 (e.g., via wired and/or wireless communication) to receive control signals for turning the fan 110 on and off and/or adjusting a speed of the fan 110. The compressed, cooled working fluid flows from the condenser 108 toward an expansion device 114.

The expansion device 114 is coupled to the working-fluid conduit subsystem 102 downstream of the condenser 108 and is configured to remove pressure from the working fluid. In this way, the working fluid is delivered to the evaporator 116 and receives heat from airflow 118 to produce a conditioned airflow 120 that is delivered by a duct subsystem 122 to the conditioned space. In general, the expansion device 114 may be a valve such as an expansion valve or a flow control valve (e.g., a thermostatic expansion valve (TXV)) or any other suitable valve for removing pressure from the working fluid while, optionally, providing control of the rate of flow of the working fluid. The expansion device 114 may be in communication with the controller 148 (e.g., via wired and/or wireless communication) to receive control signals for opening and/or closing associated valves and/or to provide flow measurement signals corresponding to the rate of working fluid flow through the working-fluid conduit subsystem 102.

The evaporator 116 is generally any heat exchanger configured to provide heat transfer between air flowing through (or across) the evaporator 116 (i.e., air of airflow 118 contacting an outer surface of one or more coils of the evaporator 116) and working fluid passing through the interior of the evaporator 116. The evaporator 116 may include one or more circuits of coils. The evaporator 116 is fluidically connected to the compressor 106, such that working fluid generally flows from the evaporator 116 to the condensing unit 104 when the HVAC system 100 is operated in a cooling mode. As described above, when the rate of the airflow 118 falls below a threshold value, a coil of the evaporator 116 may freeze resulting to periods of downtime while the evaporator 116 is repaired or replaced. Knowledge of the pulley ratio 160 and/or the rate 162 of the airflow 118 may facilitate the prevention of coil freezing. A portion of the HVAC system 100 is configured to move airflow 118 provided by the blower 128 across the evaporator 116 and out of the duct sub-system 122 as conditioned airflow 120. Return air 124, which may be air returning from the building, fresh air from outside, or some combination, is pulled into a return duct 126. An air filter 132 may be located within the return duct 126 to remove particulates from the return air 124.

A suction side of the blower 128 pulls the return air 124. The blower 128 discharges airflow 118 into a duct 130 such that airflow 118 crosses the evaporator 116 or heating elements (not shown) to produce conditioned airflow 120. The blower 128 is any mechanism for providing airflow 118 through the HVAC system 100. For example, the blower 128 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower.

A motor drive 134 supplies electrical power to the blower 128 based on instructions received from the controller 148. The motor drive 134 generally converts a signal (e.g., provided by the controller 148) into an appropriate output (e.g., with a corresponding motor drive frequency 136 and output current 138) for actuating the blower 128 (i.e., to power a motor of the blower 128). For example, the motor drive 134 may convert a sinusoidal input provided by the controller 148 into a set of voltage pulses with an appropriate frequency 136 and current 138 for driving rotation of a motor of the blower 128. The motor drive 134 may be a variable frequency motor drive. For example, the motor drive 134 may control a speed of a motor of the blower 128 (see FIG. 2 and corresponding description below) by adjusting the input frequency 136 associated with current 138 supplied to the motor of the blower 128. The motor drive 134 is in signal communication with the controller 148 and the blower 128 using any suitable type of wired and/or wireless connection. The controller 148 is configured to provide commands and/or signals to the motor drive 134 to control its operation (i.e., to control frequency 136 associated with electrical current 138 supplied to the blower 128).

Figure 2:
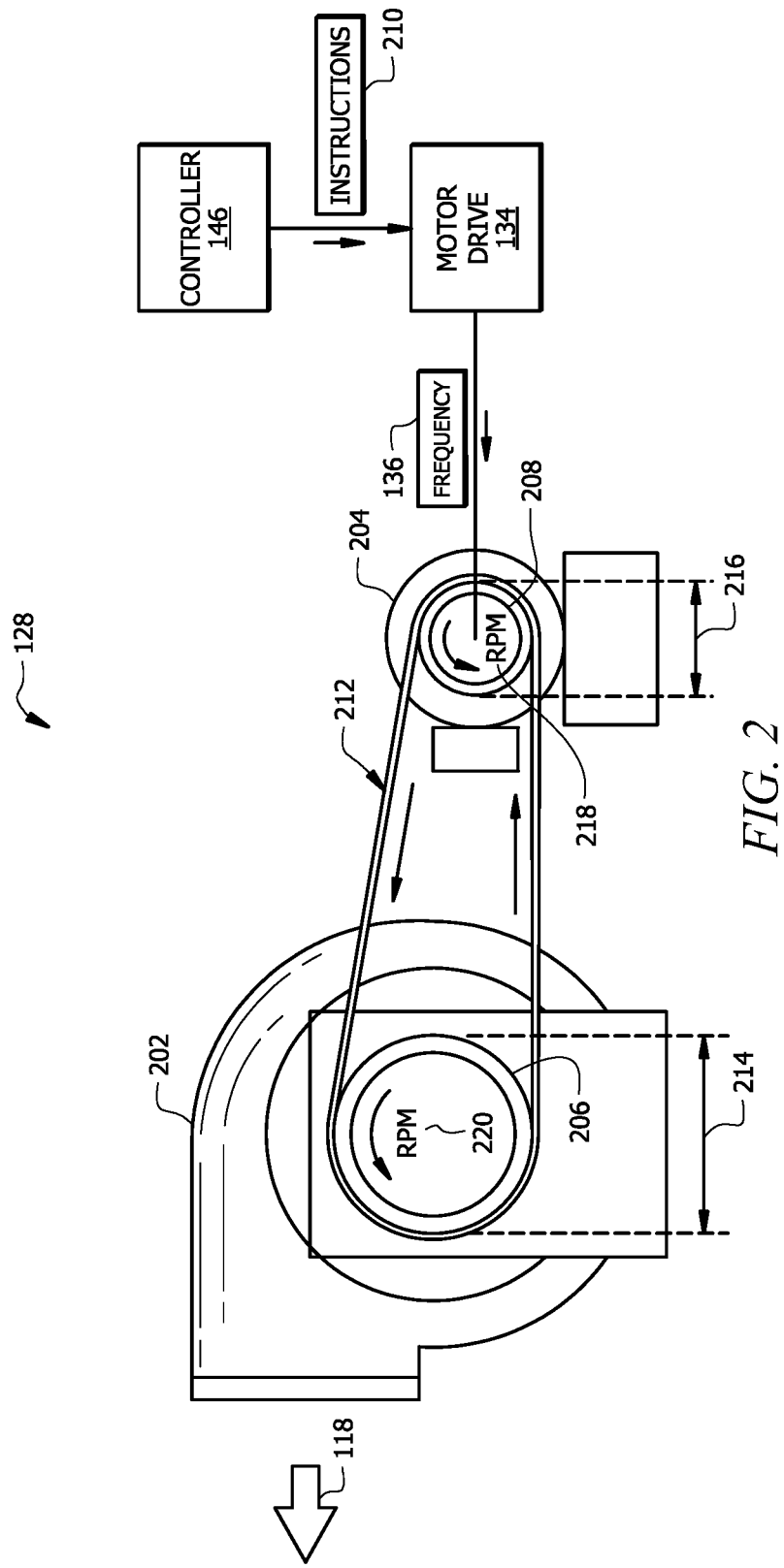
FIG. 2 is a diagram of an example blower and motor drive of the HVAC system illustrated in FIG. 1.

FIG. 2 illustrates an example of the blower 128 of FIG. 1 when the blower 128 is a belt-drive blower. As described above, previous technology lacked the ability to determine the rate of airflow 118 provided by a belt-drive blower without additional sensors for measuring a rotation rate of the blower 128 itself (i.e., rotation rate of a driven pulley 206 and/or of an impeller coupled thereto) and/or the rate of the airflow 118 itself (e.g., using an air flow sensor). Such sensors can be costly, difficult to maintain, and unreliable. The example belt-drive blower 128 includes a main blower component 202 and a motor 204. The blower component 202 generally includes one or more rotatable impellers (e.g., or fan blades) which rotate based on movement of a driven pulley 206 to which the impeller(s) are coupled. The motor 204 includes a driver pulley 208 which rotates based on properties of the electrical power (e.g., the motor drive frequency 136) supplied by the motor drive 134. A belt 212 couples the driver pulley 208 to the driven pulley 206 of the blower component 202, such that when the driver pulley 208 of the motor 204 rotates (i.e., when the motor 204 is powered), the driven pulley 206 of the blower component 202 also rotates. This results in rotation of the impeller coupled to the driven pulley 206 and provision of the airflow 118 illustrated in FIG. 1. Properties of the motor drive frequency 136 and output current 138 are generally based on instructions 210 provided by the controller 148. The instructions 210 may include the frequency 136 at which to operate the motor drive 134.

The rate 218 at which driven pulley 206 rotates compared to the rate 220 at which the driver pulley 208 rotates is determined by the pulley ratio 160, which is the ratio of the diameter 214 of the driven pulley 206 to the diameter 216 of the driver pulley 208. During installation and setup of the HVAC system 100, it is common for the diameter 216 of the driver pulley 208 to be adjusted, such that the value of diameter 216 and the corresponding pulley ratio 160 (i.e. diameter 214/diameter 216) are not known. Because the pulley ratio 160 is unknown, the rate 220 at which the driven pulley 206 is rotated and the resulting rate 162 of airflow 118 provided by the blower 128 cannot be determined using previous technology. As described elsewhere herein, this disclosure facilitates the determination of both the pulley ratio 160 and the flow rate 162 of the airflow 118 provided by the blower 128. For example, once the pulley ratio 160 is determined (as described further below) the rate 220 of rotation of the driven pulley 206 can be determined based on the known rate 218 of rotation of the driver pulley 208 and the determined pulley ratio 160. For example, if the ratio of diameter 214 to diameter 216 is about two (i.e., if the pulley ratio 160 is two), then the rate 218 of rotation of the driver pulley 208 may be twice the rate 220 of rotation of the driven pulley 206. If another appropriate parameter of the HVAC system 100 is known (e.g., the static pressure at the outlet of the blower 128), the flow rate 162 can be determined once the rate 220 of rotation of the driven pulley 206 is known (e.g., a calibrated amount of air is provided for a given rate 220 of rotation of the driven pulley 206 and at a given static pressure). Thus, in some cases, the flow rate 162 may be determined without information from any airflow sensor(s) configured to directly measure the rate 162 of the airflow 118 provided by the blower 128.

Returning to FIG. 1, the HVAC system 100 includes one or more sensors 140a,b in signal communication with controller 148 (e.g., via wired and/or wireless connection). Sensors 140a,b may include any suitable type of sensors for measuring air temperature, relative humidity, and/or any other properties of a conditioned space (e.g. a room or building). The sensors 140a,b may be positioned anywhere within the conditioned space, the HVAC system 100, and/or the surrounding environment. For example, as shown in the illustrative example of FIG. 1, the HVAC system 100 may include a sensor 140a positioned and configured to measure a return air temperature (e.g., of airflow 124) and/or a sensor 140b positioned and configured to measure a supply or treated air temperature (e.g., of airflow 120), a temperature of the conditioned space, and/or a relative humidity of the conditioned space. In other examples, the HVAC system 100 may include sensors positioned and configured to measure any other suitable type of air temperature (e.g., the temperature of air at one or more locations within the conditioned space and/or an outdoor air temperature) or other property (e.g., a relative humidity of air at one or more locations within the conditioned space).

The HVAC system 100 includes one or more thermostats 142, for example, located within the conditioned space (e.g. a room or building). A thermostat 142 is generally in signal communication with the controller 148 using any suitable type of wired and/or wireless connection. Also or alternatively, one or more functions of the controller 148 may be performed by the thermostat 142. For example, the thermostat 142 may include the controller 148. The thermostat 142 may be a single-stage thermostat, a multi-stage thermostat, or any suitable type of thermostat. The thermostat 142 is configured to allow a user to input a desired temperature or temperature setpoint 144 for the conditioned space and/or for a designated space or zone such as a room in the conditioned space. The controller 148 may use information from the thermostat 142 such as the temperature setpoint 144 for controlling the compressor 106 and/or the motor drive 134.

In some embodiments, the thermostat 142 includes a user interface and display for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for display of one or more alerts 146 (e.g., associated with a determination that a rate 162 of the airflow 118 has fallen below a threshold value associated with normal operation of the HVAC system 100) and/or messages related to the status and/or operation of the HVAC system 100. For example, an alert 146 may prompt a user to change the air filter 132 of the HVAC system 100. If the air filter 132 was recently replaced and the alert 146 is still being presented, the user may provide an indication of this and further diagnostics and/or maintenance may be warranted.

As described in greater detail below with respect to FIG. 6, the controller 148 is configured to receive a benchmark air flow rate of 150 which is provided by the blower 128 under predetermined test conditions (e.g., at a predefined motor drive frequency 136 of the motor drive 134 and/or rate of airflow 118 or 120 when the blower 128 is installed). The controller 148 also receives a corresponding benchmark output current 152 of the motor drive 134 which was provided to achieve the benchmark air flow rate 150. The controller 148, using a predetermined relationship 156 of power input to the motor drive 134 to output current by the motor drive 134 (see example relationship illustrated in FIG. 3 described below), determines an input power 154. The input power 154 corresponds to the power provided as in input to the motor drive 134 and is generally not known during operation of the HVAC system 100. A flow rate-to-input power ratio 158 is determined as the ratio of the benchmark flow rate 150 and the input power 154. The controller 148 then determines, using a predetermined relationship 164 between the pulley ratio 160 and the flow rate-to-input power ratio 158 for the blower 128 (see example relationship illustrated in FIG. 4 described below), the pulley ratio 160. The pulley ratio 160 may be used to determine the current flow rate 162 of the airflow 118 provided by the blower 128, as described in greater detail below with respect to FIGS. 5 and 6. For example, the controller 148 may use the determined pulley ratio to interpolate between flow rates determined using a relationship between flow rate 160 and input power 154 at a first pulley ratio (e.g., a minimum pulley ratio of the blower 128) and a relationship 168 between flow rate 160 and input power 154 at a second pulley ratio (e.g., a maximum pulley ratio of the blower 128), as described with respect to FIG. 5 below. Relationships 166, 168 may be predetermined for the HVAC system 100 or for components (e.g., the blower 128) of the HVAC system 100.

As described above, in certain embodiments, connections between various components of the HVAC system 100 are wired. For example, conventional cable and contacts may be used to couple the controller 148 to the various components of the HVAC system 100, including, the compressor 106, the expansion valve 114, the blower 128, the motor drive 134, sensor(s) 140a,b, and thermostat(s) 142. In some embodiments, a wireless connection is employed to provide at least some of the connections between components of the HVAC system 100. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 148 to other components of the HVAC system 100.

In an example operation of the HVAC system 100, the HVAC system 100 is installed and setup (e.g., by a technician) to provide conditioned airflow 120 to a space. During the installation and setup, a technician may adjust configurations of various components (e.g., the blower 128) such that a desired rate of airflow 118 is achieved at predefined test conditions. For example, the technician may adjust the diameter 216 of the driver pulley 208 (see FIG. 2) to achieve a predefined or desired rate of airflow 118 at a predefined motor drive frequency 136 corresponding to the test conditions. Once achieved, this desired rate of airflow 118 may be stored as the benchmark air flow rate ("benchmark CFM") 150 along with a corresponding benchmark output current 152. The benchmark output current 152 generally corresponds to the output current 138 of the motor drive 134 when the benchmark air flow rate 150 was achieved at the test conditions (i.e., at the predefined motor drive frequency 136). In some embodiments, the test conditions correspond to operating the blower 128 (e.g., or instructing the motor drive 134 to drive the blower 128) at a maximum recommended frequency 136. However, the test conditions may more generally correspond to operating the blower 128 (e.g., or instructing the motor drive 134 to drive the blower 128) at any predetermined frequency 136.

Figure 3:
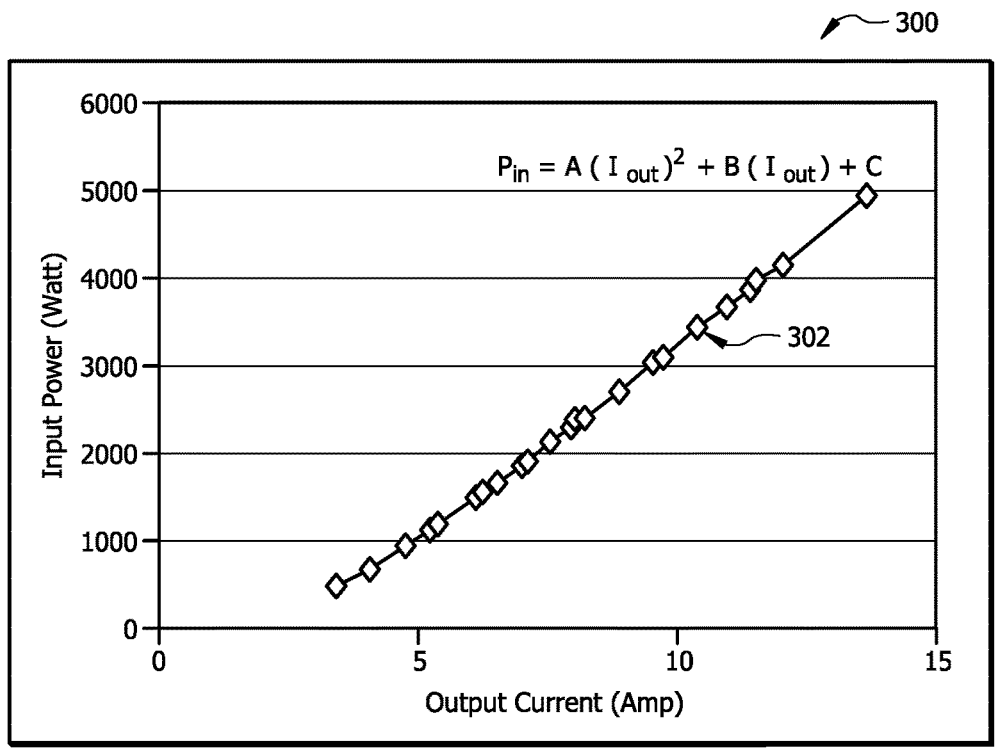
FIG. 3 is a plot illustrating an example predefined relationship between input power and output current of the motor drive of the HVAC system illustrated in FIG. 1.

The controller 148 determines an input power 154 using a predetermined relationship 156 between the input power provided to the motor drive 134 and the current 138 output by the motor drive 134. FIG. 3 illustrates an example of the relationship 156 between input power provided to the motor drive 134 and the current 138 output by the motor drive 134. The plot 300 of FIG. 3 shows a curve 302 of the power input 154 for different values of output current 138. The relationship 156 exemplified by curve 302 may be used to determine a power input 154 for any given output current 138. The relationship 156 may be stored and/or implemented in the form of an equation (e.g., an equation representing power input 154 as a function of output current 138, as illustrated in FIG. 3) and/or a lookup table comprising values of power input 154 for different values of output current 138.

Figure 4:
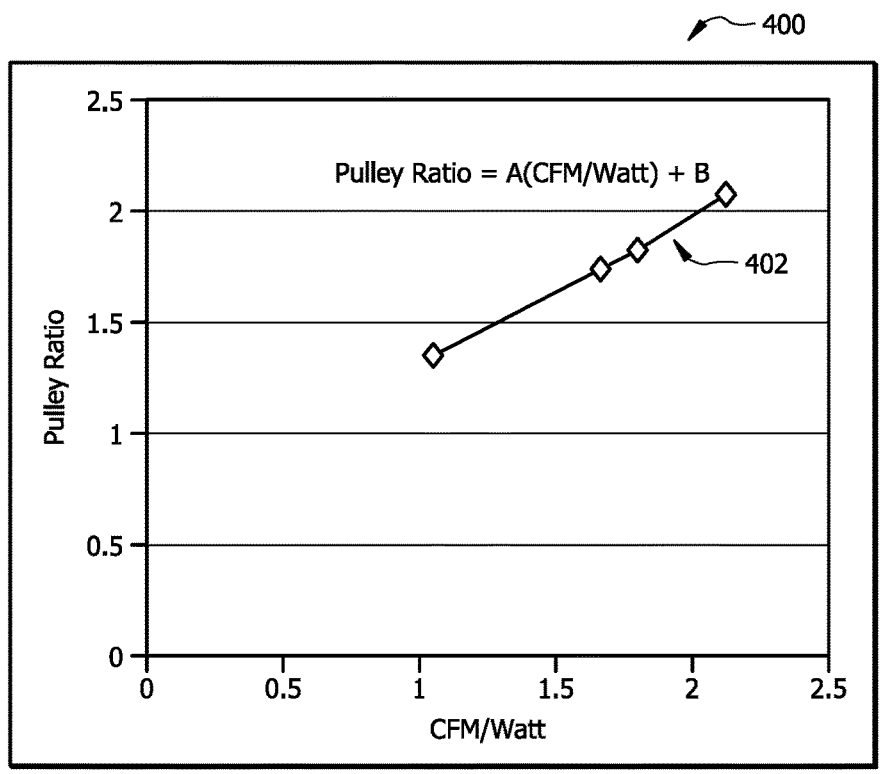
FIG. 4 is a plot illustrating an example predefined relationship between pulley ratio and the flow rate-to-input power ratio of the blower of the HVAC system illustrated in FIG. 1.

A flow rate-to-input power ratio 158 is determined as the ratio of the benchmark flow rate 150 and the benchmark input power 154. For example, the benchmark flow rate 150 may be divided by the input power 154 to determine the ratio 158. The controller 148 then determines the pulley ratio 160 using the predetermined relationship 164 between the pulley ratio 160 and the flow rate-to-input power ratio 158 for the blower 128. FIG. 4 illustrates an example of the relationship 164 between pulley ratio 160 and the flow rate-to-input power ratio 158. The plot 400 of FIG. 4 shows a curve 402 of the pulley ratio 160 for different values of the flow rate-to-input power ratio 158. The relationship 164 exemplified by curve 602 may be used to determine a pulley ratio 160 for any given flow rate-to-input power ratio 158. The relationship 164 may be stored and/or implemented in the form of an equation (e.g., an equation representing pulley ratio as a function of the flow rate-to-input power ratio 158, as illustrated in FIG. 4) and/or a lookup table comprising values of pulley ratio 160 for different values of the flow rate-to-input power ratio 158.

The pulley ratio 160 may be used to determine the current flow rate 162 of the airflow 118 provided by the blower 128 when the HVAC system 100 is later operated. Referring to the example blower 128 illustrated in FIG. 2, the controller 148 may determine the rotation rate 218 of the driver pulley 208 based on the motor drive frequency 136 and/or output current 138 of the motor drive 134. For example, the craven pulley 208 of the motor 204 may rotate at a known rate 218 when supplied a given current 138 at a given frequency 136. The controller 148 may then determine a rotation rate 220 of the driven pulley 206 of the blower 128 based on the rotation rate 218 of the driver pulley 208 and the pulley ratio 160. For example, the rotation rate 220 may be determined as the rotation rate 218 divided by the determined pulley ratio 160. The controller 148 may then determine a rate 162 of the airflow 118 provided by the blower 128 based on the determined rotation rate 220 of the driven pulley 206. For example, the blower component 202 may be calibrated to provide a known flow rate 162 of airflow 118 for a given rate 220 of rotation of the driven pulley 206.

The determined flow rate 162 may be used to improve operation of the HVAC system 100. For example, in some cases, the controller 148 may determine that the determined flow rate 162 of airflow 118 is not at a desired value (e.g., a target flow rate 708 of FIG. 7) and adjust the frequency 136 and/or output current 138 of the motor drive 134 to achieve the desired flow rate. In some embodiments, the measured air flow rate 162 may be used to adjust operation of the blower 128 and/or the compressor 106 to achieve a desired (i.e., predetermined) ratio of the rate of airflow 118 provided by the blower 128 to the tonnage of cooling provided by an HVAC system 100 (the "CFM/ton ratio"). As used herein, the ratio of the rate 162 of airflow 118 provided by the blower 128 to the tonnage of cooling provided by an HVAC system 100 is referred to as the "CFM/ton ratio" of the HVAC system 100. The rate 162 of airflow 118 provided by the blower 128 may be measured in units of cubic feet per minute (CFM). The tonnage of the HVAC system 100 corresponds to the cooling capacity of the system 100, where one "ton" of cooling corresponds to 12000 Btu/hr. The tonnage of the HVAC system 100 is largely determined by the speed of the compressor(s) 106 of the system, such that a decreased compressor speed corresponds to a decreased tonnage. The relationship between compressor speed and system tonnage is approximately linear. Accordingly, the CFM/ton ratio of the HVAC system 100 may be controlled by adjusting the speed of the compressor 106 relative to a determined rate 162 of airflow 118 provided by the blower 128. For example, once a rate 162 of airflow 118 provided by the blower 128 is determined (e.g., using any of the approaches described in this disclosure), the speed of a variable-speed compressor 106 may be decreased, to increase the CFM/ton of the HVAC system 100. Generally, if the flow rate 162 is less than a threshold value (e.g., a threshold of thresholds 710 of FIG. 7), an alert 146 may be provided to prompt a user to change the air filter and/or to indicate a need for maintenance. In some cases, if the flow rate 162 is less than a threshold value, operation of the HVAC system 100 may be automatically stopped to prevent freezing of a coil of the evaporator 116.

After operation of the HVAC system 100 for a period of time, the air flow resistance in the HVAC system 100 may change, for example, because of buildup of dust on the air filter 132. This disclosure facilitates the accurate determination of flow rate 162 even if such a change in air flow resistance has occurred. For example, when the HVAC system 100 is operating at the test conditions (e.g., at the same motor drive frequency 136 used to determine the original benchmark flow rate 150 and output current 152), a output current 138 of the motor drive 134 may be determined. A corresponding input power 154 is determined for the output current 138 using the relationship 156 between input power and output current (see FIG. 3 and corresponding description above).

Figure 5:
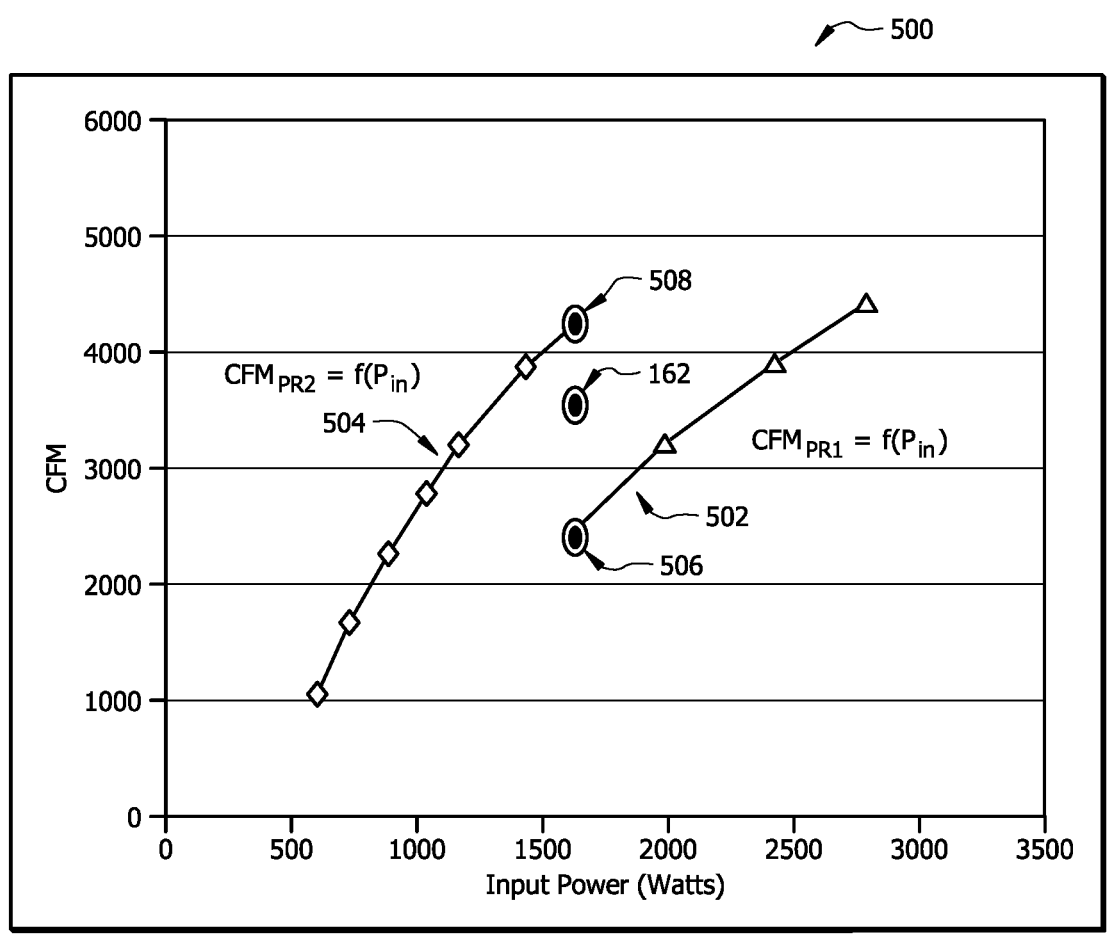
FIG. 5 is a plot illustrating the determination of a current flow rate during operation at the test condition via interpolation between predetermined flow rates at predefined pulley ratios.

The controller 148 may then determine the current rate 162 of the airflow 118 provided by the blower 128 using the determined pulley ratio 160, based on interpolation between predetermined flow rates for the current input power 154 at two different pulley ratios. This determination of a flow rate 162 based on interpolation is illustrated in FIG. 5, which shows a plot 500 of a relationship 166 (see curve 502) between flow rate 118 and input power 154 at a first pulley ratio (e.g., a minimum possible pulley ratio of the blower 128) and a relationship 168 (see curve 504) between flow rate 118 and input power 154 at a second pulley ratio (e.g., a maximum possible pulley ratio of the blower 128). Each of the relationships 166, 168 may be implemented in the form of an equation (e.g., an equation representing flow rate as a function of input power) and/or a lookup table comprising values of flow rate for different values input power for the corresponding pulley ratio (e.g., the minimum pulley ratio for relationship 166 and the maximum pulley ratio for relationship 168).

More specifically, the example of FIG. 5 illustrates the determination, via interpolation, of a flow rate 162 for the current input power 154 via interpolation between a first flow rate 506 for the first pulley ratio (PR1) and a second flow rate 508 for the second pulley ratio (PR2). In some embodiments, the first pulley ratio (PR1) is a minimum possible pulley ratio of the blower 128, and the second pulley ratio (PR2) is the maximum possible pulley ratio of the blower 128. Relationship 166, represented by curve 502 of FIG. 5, may be used to determine the first flow rate 506 at the current input power 154 if the pulley ratio were at the first pulley ratio (e.g., at the minimum pulley ratio). Similarly, relationship 168, represented by curve 504 of FIG. 5, may be used to determine the second flow rate 508 at the current input power 154 if the pulley ratio were at the second pulley ratio (e.g., the maximum pulley ratio). The current flow rate 162 is then determined via interpolation between the first flow rate 506 and second flow rate 508. For instance, the current flow rate 162 at the input power 154 (CFM($P_{in}$)) may be determined according to:

$$CFM(P_{in}) = CFM1(P_{in}) + (CFM2(P_{in}) - CFM1(P_{in}))\frac{(PR - PR1)}{(PR2 - PR1)}$$

where CFM1($P_{in}$) is the first flow rate 506 at the determined input power 154 ($P_{in}$), CFM2($P_{in}$) is the second flow rate 508 at the determined input power 154 ($P_{in}$), and PR is the determined pulley ratio 160.

As such, the HVAC system 100 may particularly facilitate accurate measurement of the flow rate 162 when the HVAC system 100 is operating at test conditions such that relationships 166, 168 may be employed to determine a flow rate 162 that reflects any changes to the input power 154 (i.e., via changes in output current 138) caused by changes in air flow resistance in the HVAC system 100.

As described above, the determined flow rate 162 may be used to optimize operation of the HVAC system 100, for example, by adjusting the motor drive frequency and/or output current 138 to achieve a desired flow rate 162 and/or to achieve a compressor speed to achieve a desired CFM/ton ratio. If the flow rate 162 is less than a threshold value, an alert 146 may be provided to prompt a user to change the air filter and/or to indicate a need for maintenance. In some cases, operation of the HVAC system 100 may be stopped to prevent freezing of a coil of the evaporator 116.

Example Method of Operation

Figure 6:
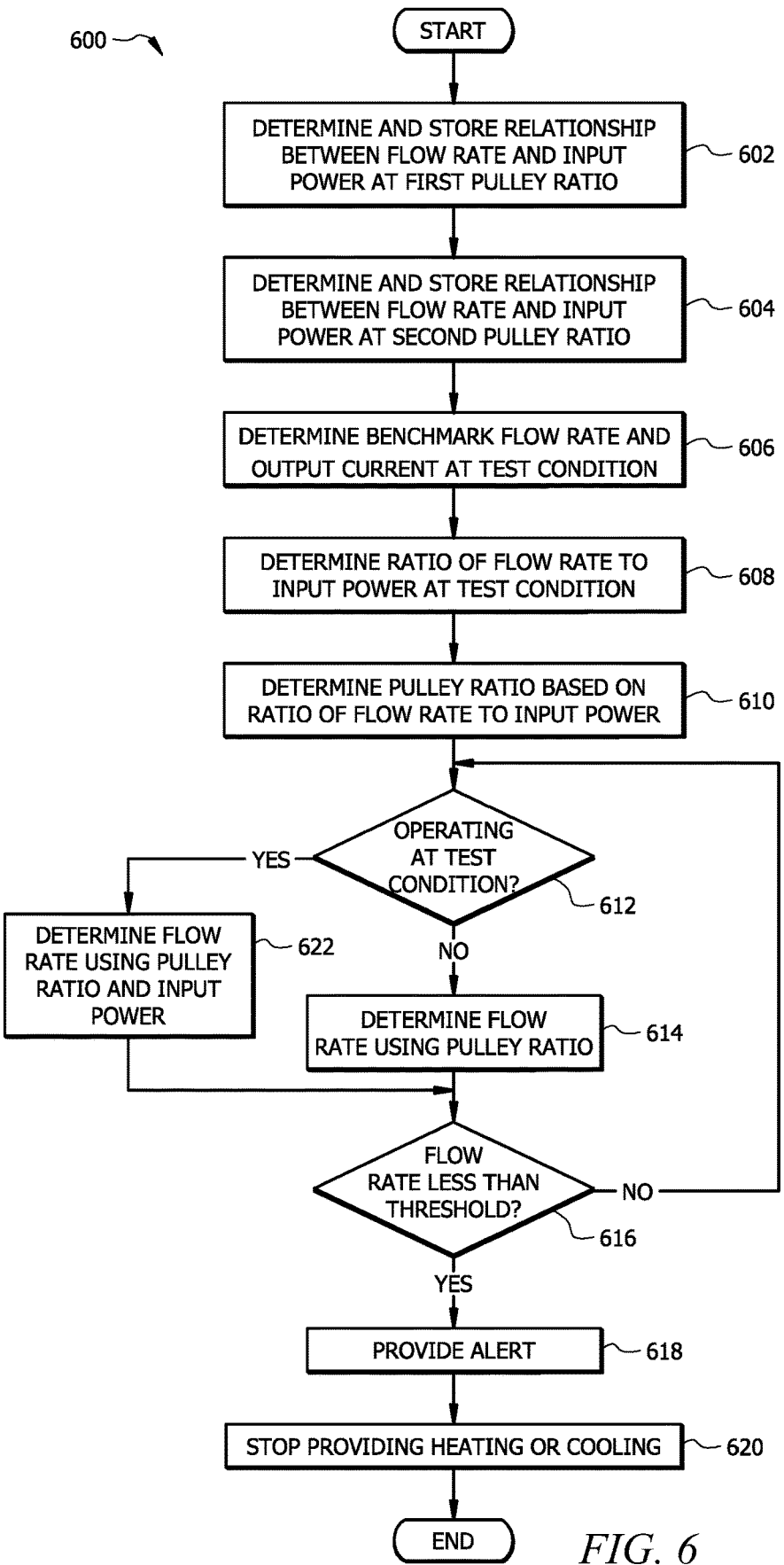
FIG. 6 is a flowchart illustrating an example method of determining a pulley ratio and a rate of the airflow provided by the blower of the example HVAC system illustrated in FIG. 1.

FIG. 6 is a flowchart illustrating an example method 600 of determining the pulley ratio 160 and the rate 162 of airflow 118 provided by the blower 128 of the HVAC system 100. Knowledge of pulley ratio 160 and flow rate 162 is typically not available for HVAC systems with a belt-drive blowers (see FIG. 2) and for systems lacking a dedicated sensor for air flow rate measurement. Method 600 may begin at step 602 where the relationship 166 between the rate of airflow 118 and input power 154 is determined at a first pulley ratio for the blower 128 (see curve 502 of FIG. 5 and corresponding description above). For example, the pulley ratio (i.e., ratio of diameter 214 to diameter 216 illustrated in FIG. 2) of the blower 128 may be adjusted to a predetermined first value (e.g., a minimum possible value for the blower 128), and flow rate may be recorded at different known values of input power. In some cases, the relationship 166 may be predetermined for the blower 128 (e.g., by a manufacturer) and provided to (i.e., stored in a memory of) the controller 148. Similarly, at step 604, the relationship 168 between rate of airflow 118 and input power 154 is determined at a second pulley ratio for the blower 128 (see curve 504 of FIG. 5 and corresponding description above). For example, the pulley ratio (i.e., ratio of diameter 214 to diameter 216 illustrated in FIG. 2) of the blower 128 may be adjusted to a predetermined second value (e.g., a maximum possible value for the blower 128), and flow rate may be recorded at different known values of input power. In some cases, the relationship 168 may be predetermined for the blower 128 (e.g., by a manufacturer) and provided to (i.e., stored in a memory of) the controller 148.

At step 606, a benchmark rate 150 of airflow 118 and a benchmark output current 152 of the motor drive 134 are received by the controller 148. These benchmark values 148, 150 are determined at test conditions (e.g., by a maintenance technician installing the blower 128 and/or setting up or installing the HVAC system 100). The test conditions generally correspond to operating the motor drive 134 at a predefined value of the motor drive frequency 136. For example, the controller 148 may cause the motor drive 134 to supply electrical current 138 to the motor (e.g., motor 204 of FIG. 2) of the blower 128 at a predefined motor drive frequency 136 in order to operate at the test condition(s). The motor drive frequency 136 may be referred to as a "speed" of the motor drive 134 and may be a value with units of hertz (Hz).

At step 608, the controller 148 determines the flow rate-to-input power ratio 158. For example, the controller may determine an input power 154 corresponding to the output current 152 based on a predetermined relationship 156 between input power and output current (see example relationship 156 of FIG. 3 described above). The relationship 156 is generally predetermined (e.g., by a manufacturer) for the motor drive 134 and provided to (i.e., stored in a memory of) the controller 148. The flow rate-to-input power ratio 158 is the benchmark flow rate 150 (from step 606) divided by the input power 154.

At step 610, the controller 148 determines the pulley ratio 160 using the flow rate-to-input power ratio 158 from step 608 and the predetermined relationship 164 between the pulley ratio 160 and the flow rate-to-input power ratio 158 (see example relationship 164 of FIG. 4 described above). The relationship 164 is generally predetermined (e.g., by a manufacturer) for the motor drive 134 and blower 128 and provided to (i.e., stored in a memory of) the controller 148. As described in the example steps below, the pulley ratio 160 determined at step 610 may be used to determine flow rate and guide operation of the HVAC system 100.

At step 612, the controller 148 may determine whether the HVAC system 100 is operating at the test conditions. For instance, the controller 148 may determine whether the motor drive frequency 136 is the same predefined frequency 136 used during establishment of the benchmark values 150, 152 at step 606. The predefined motor drive frequency 136 associated with the test conditions may be requested at some time during normal operation while the HVAC system 100 is providing heating or cooling to the space. In some embodiments, the controller 148 may be configured to perform a scheduled test of the flow rate 162 at the test conditions (e.g., to ensure the flow rate 162 at the test conditions does not indicate a large increase in air flow resistance). For example, the controller 148 may determine that a test of the flow rate 162 is scheduled (e.g., e.g., based on a schedule 714 of FIG. 7 indicating a test should be performed weekly, monthly, semiannually, annually, or the like) and automatically adjust the motor drive frequency 136 to the predefined value associated with the test conditions based on a schedule.

If the system is not operating at the test conditions, the controller 148 proceeds to step 614 where the current flow rate 162 of the airflow 118 provided by the blower 128 is determined. For example, the flow rate 162, at a given static pressure at the blower outlet, may be determined using the pulley ratio 160 to calculate a rotation rate 220 of the driven pulley 206 of the blower 128 (see FIG. 2). For example, the rotation rate 220 may be determined as the rotation rate 218 of the driver pulley 208 divided by the determined pulley ratio 160. The controller 148 may then determine a rate 162 of the airflow 118 provided by the blower 128 based on the determined rotation rate 220 of the driven pulley 206. For example, the blower component 202 may be calibrated to provide a known flow rate 162 of airflow 118 for a given rate 220 of rotation of the driven pulley 206 at a given static pressure. Any appropriate method of determining the rate 162 of airflow 118 based on the pulley ratio 160 may be used.

Once the current flow rate 162 of airflow 118 is determined the controller 148 may adjust operation of the motor drive 134 and/or other components of the HVAC system 100 to achieve desired operating parameters (e.g., a desired rate 162 of airflow 118 and/or a desired CFM/ton ratio), as described above. For example, the controller 148 may determine that the determined flow rate 162 of airflow 118 is not at a desired value (e.g., a target flow rate 708 of FIG. 7) and adjust the motor drive frequency 136 and/or output current 138 to achieve the desired flow rate. In some embodiments, the measured rate 162 of airflow 118 may be used to adjust operation of the blower 128 and/or the compressor 106 to achieve a desired (i.e., predetermined) CFM/ton ratio, as described above.

Figure 7:
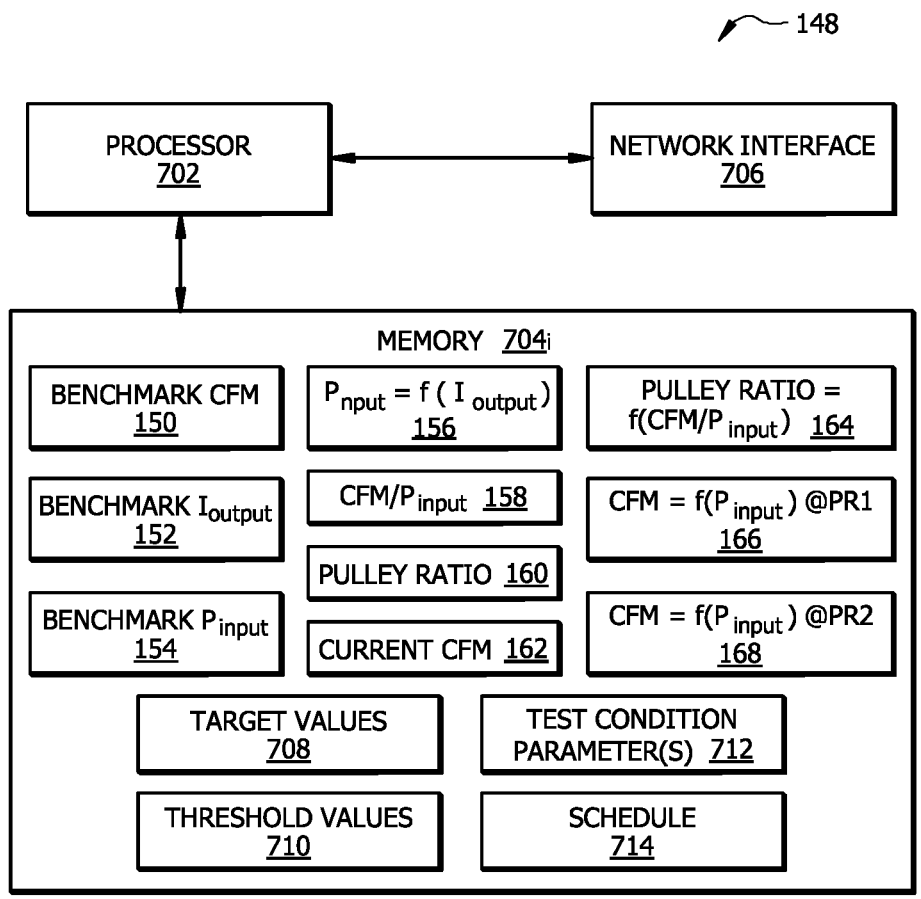
FIG. 7 is a diagram of the controller of the example HVAC system illustrated in FIG. 1.

At step 616, the controller 148 determines if the flow rate 162 is less than a threshold value (e.g., a threshold of thresholds 708 of FIG. 7). If the flow rate 162 determined at step 614 is not less than the threshold value, the controller 148 may return to step 612 and continue operation. However, if the flow rate 162 determined at step 614 is less than the threshold value, the controller 148 may proceed to step 618 where an alert 146 is provided for viewing by a user (e.g., on an interface of the thermostat 142). The alert 146 may indicate that the flow rate 162 is inadequate for current cooling or heating requirements and/or prompt a user to change the air filter 132. In some embodiments, at step 620, the controller 148 may cause the HVAC system to stop operating to provide cooling or heating (e.g., the controller 148 may stop operation of the compressor 106 and/or blower 128).

If the controller 148 determines, at step 612, that the HVAC system 100 is operating at the test conditions (i.e., at the predefined motor drive frequency 136 associated with determining benchmark values 150, 152), the controller 148 may proceed to step 622. At step 622, the controller 148 determines the current flow rate 162 of airflow 118 provided by the blower 128 via interpolation (e.g., as described above with respect to FIG. 5). For example, the controller 148 may determine the current output current 138 of the motor drive 134; (ii) use the output current 138 and the relationship 156 between input power and output current to determine a corresponding input power 154; (iii) determine a first known flow rate (e.g., rate 506 of FIG. 5) for the input power 154 and a first pulley ratio (e.g., a minimum possible pulley ratio for the blower 128); (iv) determine a second known flow rate (e.g., rate 508 of FIG. 5) for the input power 154 and a second pulley ratio (e.g., a maximum possible pulley ratio for the blower 128); and (v) determine the current flow rate 162 via interpolation between the first and second flow rates using the pulley ratio 160 determined at step 610. Following the determination of the flow rate 162, the controller 148 proceeds to step 616 described above.

Modifications, additions, or omissions may be made to method 600 depicted in FIG. 6. Method 600 may include more, fewer, or other steps. For example, steps may be performed in parallel or in any suitable order. While at times discussed as controller 148, HVAC system 100, or components thereof performing the steps, any suitable HVAC system or components thereof may perform one or more steps of the method 600.

Example Controller

FIG. 7 is a schematic diagram of an embodiment of the controller 148. The controller 148 includes a processor 702, a memory 704, and an input/output (I/O) interface 706.

The processor 702 includes one or more processors operably coupled to the memory 704. The processor 702 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 704 and controls the operation of HVAC system 100. The processor 702 may be a programmable logic device, a microcontroller, a microprocessor, or any suitable combination of the preceding. The processor 702 is communicatively coupled to and in signal communication with the memory 704. The one or more processors are configured to process data and may be implemented in hardware or software. For example, the processor 702 may be 8-bit, 16-bit, 32-bit, 64-bit or of any other suitable architecture. The processor 702 may include an arithmetic logic unit (ALU) for performing arithmetic and logic operations, processor registers that supply operands to the ALU and store the results of ALU operations, and a control unit that fetches instructions from memory 704 and executes them by directing the coordinated operations of the ALU, registers, and other components. The processor 702 may include other hardware and software that operates to process information, control the HVAC system 100, and perform any of the functions described herein (e.g., with respect to FIG. 6). The processor 702 is not limited to a single processing device and may encompass multiple processing devices. Similarly, the controller 148 is not limited to a single controller but may encompass multiple controllers.

The memory 704 includes one or more disks, tape drives, or solid-state drives, and may be used as an over-flow data storage device, to store programs when such programs are selected for execution, and to store instructions and data that are read during program execution. The memory 704 may be volatile or non-volatile and may include ROM, RAM, ternary content-addressable memory (TCAM), dynamic random-access memory (DRAM), and static random-access memory (SRAM). The memory 704 is operable to store benchmark flow rates 148, benchmark output currents 150, current output currents 152, determined flow rates 154, target values 708 (i.e., target values of flow rate 162 and/or for CFM/ton of the HVAC system 100), thresholds 710 (e.g., any of the threshold values described in this disclosure), test condition parameters 712 (e.g., the predefined value of motor drive frequency 136 used during determination of benchmark values 150, 152), schedule 714 (e.g., for determining when to operate the HVAC system 100 at the test conditions), and/or any other logic and/or instructions for performing the function described in this disclosure.

The I/O interface 706 is configured to communicate data and signals with other devices. For example, the I/O interface 706 may be configured to communicate electrical signals with components of the HVAC system 100 including the compressor 106, expansion valve 114, blower 128, sensors 140a,b, motor drive 134, and thermostat 142. The I/O interface may provide and/or receive, for example, compressor speed signals, blower speed signals, temperature signals, relative humidity signals, thermostat calls, temperature setpoints, environmental conditions, and an operating mode status for the HVAC system 100 and send electrical signals to the components of the HVAC system 100. The I/O interface 706 may include ports or terminals for establishing signal communications between the controller 148 and other devices. The I/O interface 706 may be configured to enable wired and/or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation and air conditioning (HVAC) system, comprising:
    a blower comprising:
        a driven pulley configured, when rotated, to cause a flow of air to be provided through at least one duct of the HVAC system; and
        a motor configured, when supplied electrical power, to cause a driver pulley to rotate, wherein the driver pulley is coupled to the driven pulley via a belt;
    a motor drive configured to supply the electrical power to the motor of the blower;
    a controller communicatively coupled to the motor drive, the controller configured to:
        receive a benchmark rate of the flow of air provided by the blower and a corresponding benchmark output current of the motor drive;
        determine a benchmark input power corresponding to the benchmark output current based on a predetermined relationship between input power and output current for the motor drive;
        determine a flow rate-to-input power ratio corresponding to a ratio of the benchmark rate of the flow of air provided by the blower to the benchmark input power; and
        determine a pulley ratio for the blower based on a predetermined relationship between the flow rate-to-input power ratio and the pulley ratio for the blower.

2. The system of claim 1, the controller further configured, during operation of the HVAC system to provide heating or cooling, to:
    determine a rotation rate of the driven pulley based on a rotation rate of the driver pulley and the pulley ratio; and
    determine a rate of the flow of air provided by the blower based on the determined rotation rate of the driven pulley.

3. The system of claim 2, further comprising:
    a compressor configured to compress a refrigerant flowing through the HVAC system; and
    the controller communicatively coupled to the compressor and further configured to:
        determine, based on the rate of the flow of air provided by the blower and a speed of the compressor, a ratio of air flow rate to tonnage of cooling (CFM/ton ratio) for the HVAC system;
        determine that the CFM/ton ratio is different than a predefined target ratio; and
        in response to determining that that the CFM/ton ratio is different than the target ratio, adjust one or both of the rate of the flow of air provided by the blower and the speed of the compressor to obtain the target ratio.

4. The system of claim 2, the controller further configured to:
    determine that the rate of the flow of air provided by the blower is less than a target value; and
    in response to determining that the rate of the flow of air provided by the blower is less than the target value, cause the motor drive to supply an increased amount of the electrical power to the motor of the blower.

5. The system of claim 1, the controller further configured to:
    determine a current output current of the motor drive during operation of the blower, wherein the current output current is different than the benchmark output current;
    determine a current input power based on the predetermined relationship between input power and output current for the motor drive; and
    determine a current rate of the flow of air provided by the blower using the determined pulley ratio, based on interpolation between predetermined flow rates at the determined current input power and two different pulley ratios.

6. The system of claim 5, the controller further configured to:
    determine that the current rate of the flow of air provided by the blower is less than a threshold value; and
    in response to determining that the current rate of the flow of air is less than the threshold value, provide an alert indicating inadequate airflow in the HVAC system.

7. The system of claim 5, the controller further configured to, prior to determining the current output current of the motor drive:
 determine that a flow rate test is scheduled; and
 cause the blower to operate at a test condition by causing the motor drive to supply power to the motor of the blower at a predefined motor drive frequency;
 wherein the benchmark rate of the flow of air provided by the blower and the corresponding benchmark output current of the motor drive are associated with operation of the blower at the test condition.

8. A method comprising, by a controller of a heating, ventilation and air conditioning (HVAC) system:
 determining a benchmark rate of the flow of air provided by a blower of the HVAC system and a corresponding benchmark output current of a motor drive, wherein the blower comprises:
  a driven pulley configured, when rotated, to cause a flow of air to be provided through at least one duct of the HVAC system; and
  a motor configured, when supplied electrical power by a motor drive, to cause a driver pulley to rotate, wherein the driver pulley is coupled to the driven pulley via a belt;
 determining a benchmark input power corresponding to the benchmark output current based on a predetermined relationship between input power and output current for the motor drive;
 determining a flow rate-to-input power ratio corresponding to a ratio of the benchmark rate of the flow of air provided by the blower to the benchmark input power; and
 determining a pulley ratio for the blower based on a predetermined relationship between the flow rate-to-input power ratio and the pulley ratio for the blower.

9. The method of claim 8, further comprising, during operation of the HVAC system to provide heating or cooling, to:
 determining a rotation rate of the driven pulley based on a rotation rate of the driver pulley and the pulley ratio; and
 determining a rate of the flow of air provided by the blower based on the determined rotation rate of the driven pulley.

10. The method of claim 9, further comprising:
 determining, based on the rate of the flow of air provided by the blower and a speed of a compressor of the HVAC system, a ratio of air flow rate to tonnage of cooling (CFM/ton ratio) for the HVAC system;
 determining that the CFM/ton ratio is different than a predefined target ratio; and
 in response to determining that that the CFM/ton ratio is different than the target ratio, adjusting one or both of the rate of the flow of air provided by the blower and the speed of the compressor to obtain the target ratio.

11. The method of claim 9, further comprising:
 determining that the rate of the flow of air provided by the blower is less than a target value; and
 in response to determining that the rate of the flow of air provided by the blower is less than the target value, causing the motor drive to supply an increased amount of the electrical power to the motor of the blower.

12. The method of claim 8, further comprising:
 determining a current output current of the motor drive during operation of the blower, wherein the current output current is different than the benchmark output current;
 determining a current input power based on the predetermined relationship between input power and output current for the motor drive; and
 determining a current rate of the flow of air provided by the blower using the determined pulley ratio, based on interpolation between predetermined flow rates at the determined current input power and two different pulley ratios.

13. The method of claim 12, further comprising:
 determining that the current rate of the flow of air provided by the blower is less than a threshold value; and
 in response to determining that the current rate of the flow of air is less than the threshold value, providing an alert indicating inadequate airflow in the HVAC system.

14. The method of claim 12, further comprising, prior to determining the current output current of the motor drive:
 determining that a flow rate test is scheduled; and
 causing the blower to operate at a test condition by causing the motor drive to supply power to the motor of the blower at a predefined motor drive frequency;
 wherein the benchmark rate of the flow of air provided by the blower and the corresponding benchmark output current of the motor drive are associated with operation of the blower at the test condition.

15. A controller for operating a blower of a heating, ventilation, and air conditioning (HVAC) system, the controller comprising:
 an input/output interface configured to receive a benchmark rate of the flow of air provided by a blower of the HVAC system and a corresponding benchmark output current of a motor drive, wherein the blower comprises:
  a driven pulley configured, when rotated, to cause a flow of air to be provided through at least one duct of the HVAC system; and
  a motor configured, when supplied electrical power by the motor drive, to cause a driver pulley to rotate, wherein the driver pulley is coupled to the driven pulley via a belt; and
 a processor coupled to the input/output interface and configured to:
  determine a benchmark input power corresponding to the benchmark output current based on a predetermined relationship between input power and output current for the motor drive;
  determine a flow rate-to-input power ratio corresponding to a ratio of the benchmark rate of the flow of air provided by the blower to the benchmark input power; and
  determine a pulley ratio for the blower based on a predetermined relationship between the flow rate-to-input power ratio and the pulley ratio for the blower.

16. The controller of claim 15, the processor further configured, during operation of the HVAC system to provide heating or cooling, to:
 determine a rotation rate of the driven pulley based on a rotation rate of the driver pulley and the pulley ratio; and
 determine a rate of the flow of air provided by the blower based on the determined rotation rate of the driven pulley.

17. The controller of claim 15, the processor further comprising configured to:
 determine, based on the rate of the flow of air provided by the blower and a speed of a compressor of the HVAC system, a ratio of air flow rate to tonnage of cooling (CFM/ton ratio) for the HVAC system;

determine that the CFM/ton ratio is different than a predefined target ratio; and in response to determining that that the CFM/ton ratio is different than the target ratio, adjust one or both of the rate of the flow of air provided by the blower and the speed of the compressor to obtain the target ratio.

18. The controller of claim 15, the processor further configured to:

determine that the rate of the flow of air provided by the blower is less than a target value; and in response to determining that the rate of the flow of air provided by the blower is less than the target value, cause the motor drive to supply an increased amount of the electrical power to the motor of the blower.

19. The controller of claim 15, the processor further configured to:

determine a current output current of the motor drive during operation of the blower, wherein the current output current is different than the benchmark output current;

determine a current input power based on the predetermined relationship between input power and output current for the motor drive; and determine a current rate of the flow of air provided by the blower using the determined pulley ratio, based on interpolation between predetermined flow rates at the determined current input power and two different pulley ratios.

20. The controller of claim 19, the processor further configured to:

determine that the current rate of the flow of air provided by the blower is less than a threshold value; and in response to determining that the current rate of the flow of air is less than the threshold value, provide an alert indicating inadequate airflow in the HVAC system.

* * * * *